Patented Oct. 16, 1951

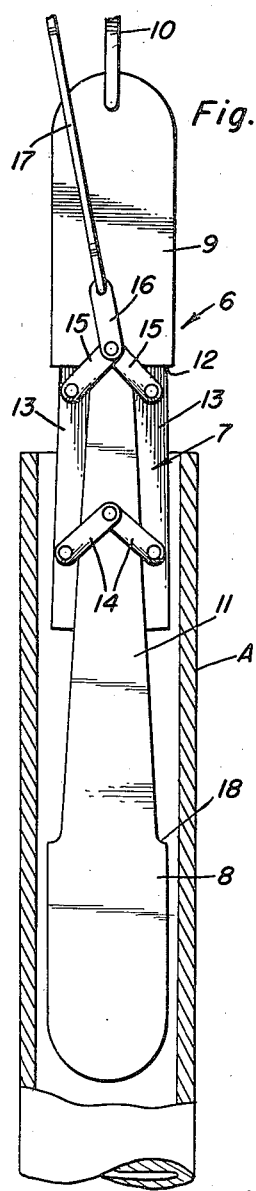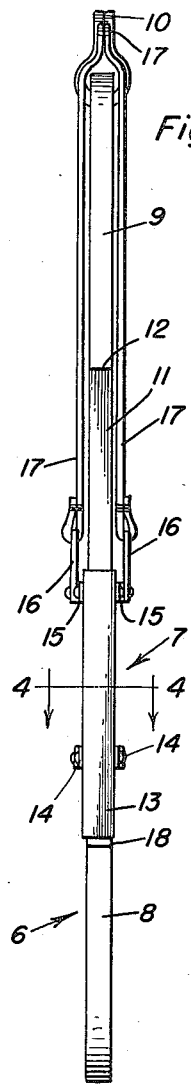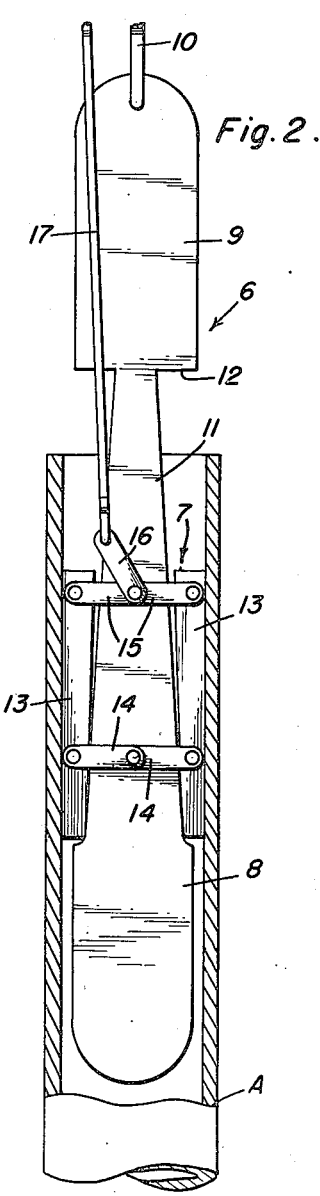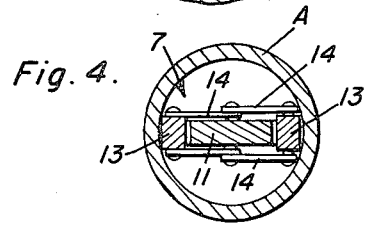

2,571,619

UNITED STATES PATENT OFFICE 2,571,619

PIPE PULLER

Harold H. Rusk, Rensselaer, Ind.

Application October 20, 1947, Serial No. 780,807

1 Claim. (Cl. 294—93)

The present invention relates to a novel and improved instrumentality or tool, which is expressly, but not necessarily, adapted for fishing explorations in oil wells and which serves to enable the user to retrieve pipes and pipe sections which have been dropped into said wells.

More specifically, the invention appertains to a tubular pipe gripping, pulling and extracting tool, which is such that it may be inserted into the bore of the pipe, and which is such that when a pulling force is exerted upon cables which are attached to parts of the tool, a gripping result will be had, making the extracting step effective.

From the preceding description, it is evident that I am sufficiently conversant with the art to which the invention relates to appreciate that so-called expansible and contractible slips and jaws, and flexible line controls for same, are not broadly new. It follows that it is the purpose and object of the instant invention to structural, functionally and otherwise improve upon known types of fishing tools, the desired ends being achieved in a tool which is such, as to aptly fulfill the requirements of the trade and users alike.

In carrying out the principles of the preferred embodiment of the present invention, I provide a tool which is characterized by a primary unit which is lowered and piloted into place in the tube to be pulled and, in addition, provide a secondary unit with tube or pipe grips; independent cables being provided for said units, whereby to permit same to be orderly operated, to assuredly attain the ends desired.

Other objects and advantages of the invention will become more readily apparent from the following description and the accompanying illustrative drawings.

In the drawings:

Figure 1 is an elevational view of the improved fishing and pulling tool, showing a fragmentary portion of the pipe or tube to be extracted and showing the friction-gripping jaws or slips disengaged.

Figure 2 is a view based on Figure 1, showing the slips in frictional engagement with the pipe, this being the position of parts when the pipe is to be lifted and pulled.

Figure 3 is an edge view of the tool removed from the pipe, this view being at right angles to Figures 1 and 2, and the slips being in the position seen in Figure 2.

Figure 4 is a cross-section on the line 4—4 of Figure 3, including, for illustration, a portion of the pipe.

Referring now to the drawings by distinguishing reference numerals, it will be seen that the primary unit of the over-all structure is denoted by the numeral 6, whereas the complemental and the secondary unit is denoted by the numeral 7.

Unit 6 comprises a one-piece body which includes, at the lower insertable end, a piloting element 8 and which has, at its upper end, a head 9 to which the chief or main lifting and lowering cable 10 is suitably connected. The intermediate portion of the body is of elongated and tapered form and constitutes a wedge 11. The lower end of the wedge virtually merges into the longitudinal edge portions of the pilot element 8, whereas the narrower end of the wedge coacts with the head 9 and defines stop shoulders 12.

The unit 7 comprises a pair of substantially wedge-shaped jaws or slips 13, these being in the form of relatively small bar members and having their inclined surfaces coacting with the wedge surfaces of the expander wedge 11. The parts 13 are connected by pairs of toggle-links 14 and 15, the links 15 carrying connectors 16 to accommodate the auxiliary jaw actuating line or cable 17.

The jaw-equipped unit 7 is slidably mounted on the expander 11 and the linkage arrangement embraces the expander and confines the respective parts to the mechanical association seen in the drawings. The shoulders 12 limit the upward sliding movement of the jaws 13. Somewhat similar shoulders 18 exist between the pilot 8 and expander 11 and limit the downward sliding movement of said jaws. The connector links 16 are on both sides of the head 9, as shown, and there is a plural association of cables 17 to accommodate such arrangement.

It is evident that in operation, the units 6 and 7 are normally in the relationship seen in Figure 1, and both units, thus inter-related, are lowered into the pipe or tube A. The pilot 8 produces the desired initial step and follow-through requirements for other parts. After the tool is piloted into place, and it is evident that the expander and jaws are in an effective position to afford the requisite clamping action, the cable means 17 is operated independently of the cable means 10 and the jaws 13 ride down into contact with the expander edges of the wedge means 11 and the jaws are forced and wedged into frictional contact with the inner surface of the bore of the pipe, as shown in Figure 2. Now, with the tool thus frictionally gripping the pipe, the cable 10 is operated and the tool and pipe achieve what is wanted, the engagement of the tool with the pipe, and the lifting of the pipe and tool from the well.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention what is claimed as new is:

A well fishing tool of the class described comprising a liftable and lowerable one-piece body, said body being substantially rectangular in cross-section and having a pilot at the lower end with a rounded tip portion adapted to advance into a well, having a head at its upper end and having an intermediate portion between the pilot and head, said intermediate portion being elongated and wedge-shaped and providing an expander, there being shoulders at the junctural point of connection between the expander and pilot element and additional shoulders at the junctural point of connection between the head and adjacent end of the expander, the last-named shoulders constituting lifting members, a lifting and lowering cable attached to said head, a pair of jaws in the same plane and in a plane with said expander having bevelled inner edge portions in slidable contact with the respective longitudinal edges of said expander, the upper ends of said jaws being engageable with said second-named shoulders, and pairs of links situated upon opposite sides of said expander operatively joining the respective jaws in assembled relation on said expander, and additional cable means connected with and for opening and closing certain of said links.

HAROLD H. RUSK.

REFERENCES CITED

The following references are of record in the file of this patent:

UNITED STATES PATENTS

| Number | Name | Date |
|---|---|---|
| 51,842 | Lowry | Jan. 2, 1866 |
| 688,543 | Petit | Dec. 10, 1901 |